United States Patent [19]
Aubert

[11] Patent Number: 4,772,000
[45] Date of Patent: Sep. 20, 1988

[54] CLAMPING DEVICE

[75] Inventor: Michel Aubert, Mill Valley, Calif.

[73] Assignee: Dahlgren Control Systems, Inc., South San Francisco, Calif.

[21] Appl. No.: 541

[22] Filed: Jan. 5, 1987

[51] Int. Cl.⁴ .................................................. B23Q 3/02
[52] U.S. Cl. .............................. 269/137; 269/254 CS; 269/257
[58] Field of Search .................................... 269/91–94, 269/99, 100, 134–138, 254 CS, 257, 279, 902; 81/418, 422, 419

[56] References Cited

U.S. PATENT DOCUMENTS

| | | | |
|---|---|---|---|
| 1,279,324 | 9/1918 | Giard . | |
| 2,351,436 | 6/1944 | Ketz | 269/93 |
| 2,637,249 | 7/1949 | Swenson . | |
| 2,654,129 | 5/1949 | Neff . | |
| 2,814,096 | 7/1953 | Herbrecht . | |
| 3,088,729 | 5/1963 | Marcus | 269/254 CS |
| 3,436,072 | 4/1969 | Svenson | 269/94 |
| 3,512,794 | 5/1970 | Lohman | 269/136 |
| 4,186,916 | 2/1980 | Varga . | |
| 4,198,038 | 4/1980 | Quinter | 269/137 |
| 4,345,750 | 8/1982 | Glaser | 269/138 |
| 4,445,678 | 5/1984 | George . | |

FOREIGN PATENT DOCUMENTS

| | | | |
|---|---|---|---|
| 2560092 | 8/1985 | France | 269/94 |

*Primary Examiner*—Robert C. Watson
*Attorney, Agent, or Firm*—Limbach, Limbach & Sutton

[57] ABSTRACT

A clamping device (22) for use in combination with a T-slotted working surface (20) which comprises a slotted clamp member (24), a screw (36), a T-nut (42) and a nosepiece (54) whereby a spring (52) biases the nosepiece against a workpiece (16) edge to rigidly register the workpiece relative to an engraving bit head assembly (12).

4 Claims, 1 Drawing Sheet

CLAMPING DEVICE

TECHNICAL FIELD

This invention relates generally to clamping devices, and more particularly to clamping devices for use in combination with a slotted work surface and adaptable to a variety of workpiece thicknesses.

BACKGROUND OF THE INVENTION

Advances in machine design, especially robotics, have enabled precision operations in a fully automated context. The present invention, while developed in conjunction with engraving applications has many uses wherein rigid, precise and play-free registration of a workpiece must be made relative to a working member, without damage to the workpiece surface. One example of such an application is found in U.S. Pat. No. 4,561,814, which describes a mechanical engraving table having a slotted surface whose slots permit a first iteration of workpiece positioning.

The present invention provides a clamping device for use in conjunction with a slotted working table. This clamping device is particularly useful for rigidly registering plate-type workpieces relative to a working member, e.g., an engraving bit. The clamp, by virtue of a spring-biased nosepiece with a stepped surface on one end and stepped workpiece receiving surfaces as an integral part of the other end, is easily adjustable for a wide range of plate thicknesses and plate sizes. Further, the clamping device engages the workpiece in a non-destructive manner, leaving the plate free of markings. The clamping device of the present invention provides sufficient rigidity to resist the torque forces generated by the engraving bit as well as to maintain accurate positioning of the workpiece as the working member contacts the workpiece. The clamping device is also capable of handling irregularly shaped workpieces. Furthermore, the clamping device is able to achieve high throughput because the device is simple to operate, fastening and releasing work pieces by the mere turn of the screw.

The clamping device according to the present invention is different from conventional clamps in several ways. Many vices and clamps presently available are substantially larger than the clamp presented here. However, most of these clamps are not capable of clamping workpieces as large. The clamp of this invention can be used to clamp pieces nearly as large as the slotted work station with which this clamp is used. Further, this clamp does not have to fit onto any particular section of the work station. It can be secured almost anywhere on the work station. This clamp is also easily moveable.

Many of the clamps now available commercially hold the workpiece by securing it between two clamp bars. These clamps provide no support for the top of the workpiece. The instant clamp secures the top surface of the workpiece as well as its sides, the stepped working surfaces disposed at an acute angle to the workpiece, and the spring-biased nose pushing the workpiece downward and against the work station surface.

Unlike most other clamps, the instant clamp is designed for a T-slot table. A slot through the clamp member spans nearly two-thirds of its length, receiving a screw which cooperates with the T-nut assembly to secure the clamp and the workpiece to the surface of the work station. This creates a force perpendicular to the working surface.

Therefore, it is an object of this invention to provide a clamping device for use in combination with a slotted working surface which is simple to position and reposition.

It is a further object of this invention to provide a clamping device which is sufficiently rigid and precise for engraving procedures.

It is a still further object of this invention to provide a clamping device which is adaptable to a variety of workpieces.

SUMMARY OF THE INVENTION

A clamping device, useful in combination with a slotted working surface, for rigidly registering a workpiece relative to a working member which comprises a spring means, a threaded screw having an enlarged head and a shaft; a cylindrical dowel; a T-nut for receiving said threaded screw; an elongate clamp member having upper and lower parallel surfaces and front and back sloped ends; a screw-receiving slot through said clamp member upper and lower surfaces disposed along the clamp member longitudinal axis; a clamp member, dowel receiving aperture disposed horizontally and perpendicular to said clamp member longitudinal axis near the front end of said clamp member; a clamp member, shaft-receiving opening through said clamp member front end disposed parallel to said clamp member front end slope near the clamp member front end; a clamp nose piece having an elongate, cylindrical shaft and a crossbar which is fastened to said shaft perpendicular to the shaft longitudinal axis and which has work piece receiving channels on a surface distal from said shaft; a spring means receiving cavity within the clamp nosepiece shaft; and a nosepiece, dowel-receiving slot through said shaft disposed along the shaft longitudinal axis whereby said threaded screw and T-nut cooperate to rigidly fasten said clamp member to a slotted work station surface and wherein said spring means is held within the nosepiece shaft between the crossbar and the dowel pin to selectively bias the clamp nosepiece against a workpiece.

DETAILED DESCRIPTION OF THE INVENTION

Figure 1:
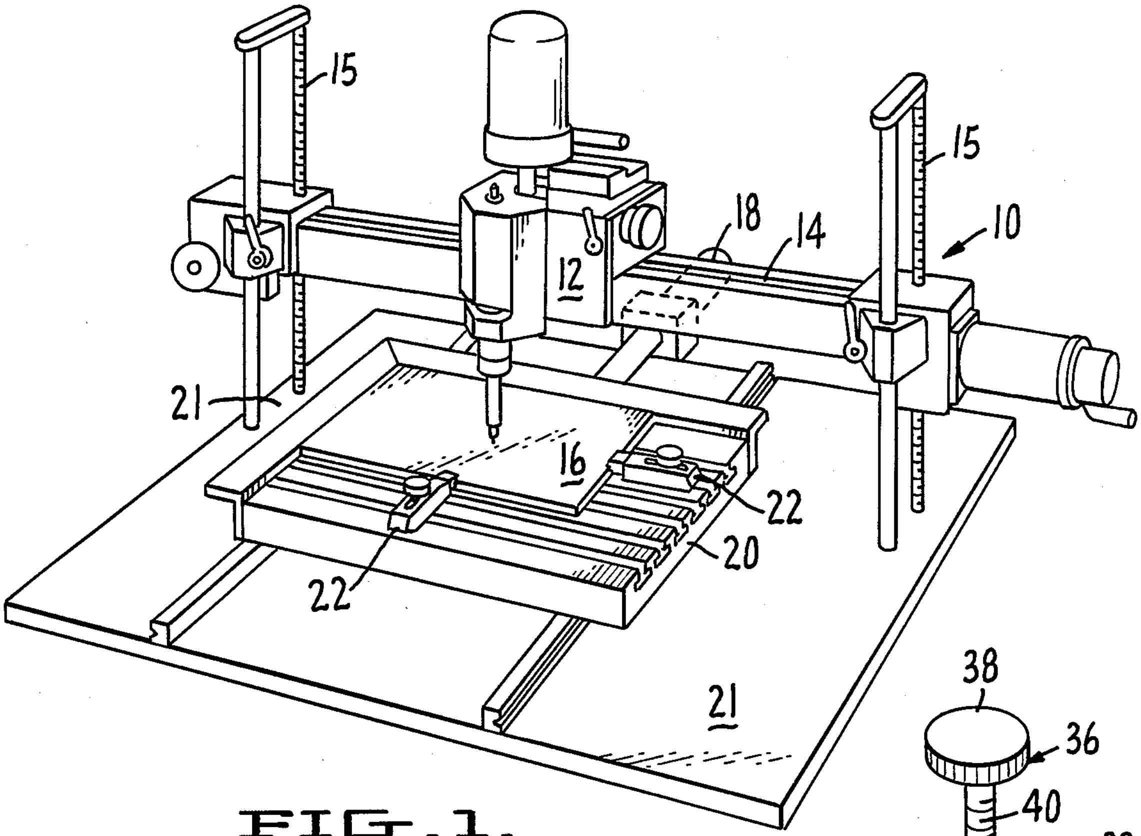
FIG. 1 is a perspective view of a mechanical engraving table with a slotted working surface and a plate held in place by clamping devices according to the present invention.

As noted above, this description of the preferred embodiment is made with reference to an engraving machine for purposes of illustration only. Other applications of the present clamping device, apparent to those skilled in the art, are intended to be within the scope of the claims appended hereto. Referring now to FIG. 1, a mechanical engraving machine 10 is shown. An engraving bit head assembly 12 is translated in the x-axis across a horizontal chassis 14 and in the z-axis by vertical jack screws 15, relative to a workpiece 16. The workpiece 16 is translated in the y-axis by a y-axis actuator 18 which moves a slotted work station 20, relative to table 21. Thus, the engraving bit head assembly 12 can be controlled in all three axes to permit precise engraving, including control of the depth of the cut. A more complete description of the components of the engraving machine 10, including its control features, can be found in U.S. Pat. No. 4,561,814. For our present purposes, it is merely important to note that the operation of the engraving bit subtended from the engraving bit head assembly 12, when it comes into contact with the work piece 16, will exert torque forces upon the work piece which must be countered by clamps 22 in order to maintain the precision and accuracy required for engraving operations, without damaging the surface to be engraved.

Figure 2:
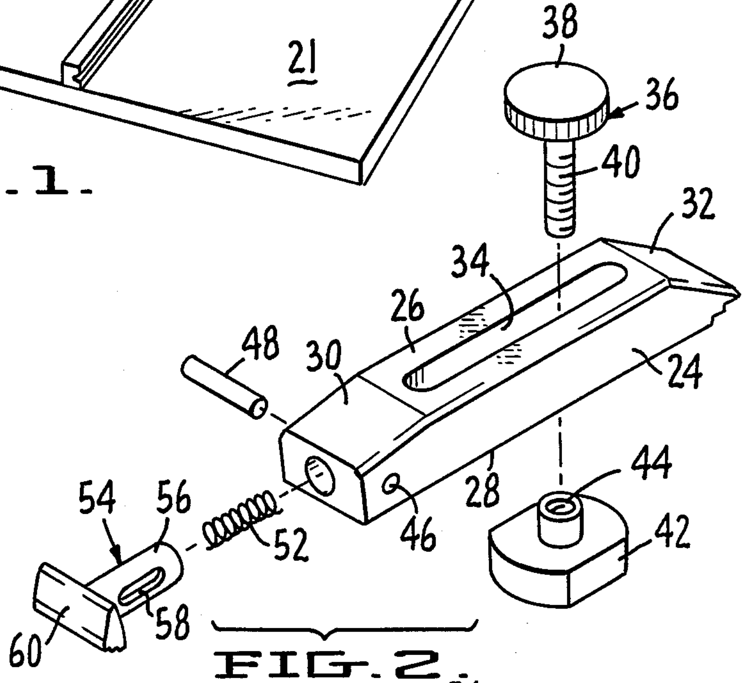
FIG. 2 is a perspective, exploded view of the preferred embodiment of the clamping device of the present invention.

Clamping device 22 is shown in exploded, perspective view in FIG. 2. In this preferred embodiment, clamp member 24 has parallel upper 26 and lower 28 surfaces and front 30 and rear 32 sloped ends. The front end 30 of clamp member 24 is that end which accepts a clamp nosepiece. Clamp member 24 has a slot 34 disposed along its longitudinal axis. This slot 34 passes entirely through the parallel upper 26 and lower 28 surfaces of clamp member 24 to receive a fastening screw 36 which has an enlarged head 38 and a threaded shaft 40. The enlarged head 38 is provided to permit manual release and tightening of the clamp 22 without need for special tools. A T-nut 42 is provided to accept the threaded shaft 40 into an internally-threaded nut section 44. The T-nut 42 has two parallel edges which cooperate with the slotted work station as described below with reference to FIG. 4.

In this preferred embodiment, the dimensions of the clamping device maximize its utility. The clamping device 22 is 3 inches long, $\frac{5}{8}$ inch wide and $\frac{1}{2}$ inch tall. The low profile permits its use when there is limited clearence between the workpiece 16 and engraving bit head assembly 12.

The front end 30 of clamp member 24 is configured to accept and adjustably position the clamp nosepiece 54. A dowel-receiving opening 46 passes widthwise across the clamp member 24. A cylindrical dowel 48 passes through the opening 46. The front end 30 of clamp member 24 also has a shaft-receiving opening 50 which runs lengthwise along the clamp member in a plane parallel to the sloped surface of the front end 30 to accept the clamp nosepiece 54. Clamp nosepiece 54 has a cylindrical shaft section 56 through which passes a dowel-receiving slot 58. A crossbar member 60 completes the clamp nosepiece 54 and therein accepts the workpiece edges in channels formed in the bottom surface of the crossbar member 60.

Figure 3:
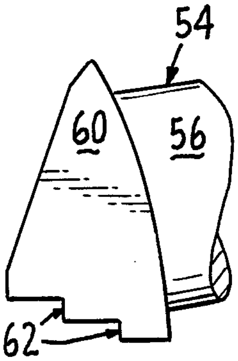
FIG. 3 is a fragmentary elevational view of the clamp nosepiece.

The clamp nosepiece 54 is shown in greater detail in FIG. 3. From this end-on view, it can be seen that crossbar member 60 has a stepped surface 62 which creates channels for receiving work pieces edges. This stepped surface 62 improves the versatility of the clamping device 22 because it permits interaction with workpieces having thicknesses as thin as 0.010 inches. The indentations in the stepped surface are shallower than standard clamps, so less of the workpiece's edge is covered by the clamping device 22 when it is held down on the T-slotted work station 20. In this manner, the nosepiece 54 can get a solid grip on the engraving material, while only covering a small fraction of the workpiece surface thus leaving virtually the entire plate available for engraving.

Figure 4:
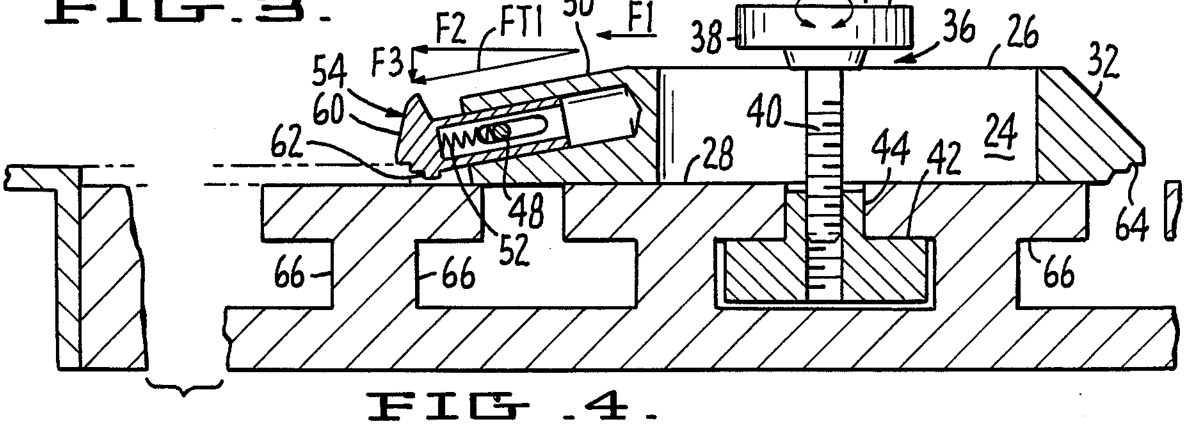
FIG. 4 is a partial cross-sectional view of a mechanical engraving table, slotted working surface and plate such as is shown in FIG. 1.

As shown in FIGS. 2 and 4, the rear end 32 of the clamping device 22 also contains stepped workpiece-receiving surface 64. This surface 64 is provided to receive workpieces with thicknesses in excess of 0.010 inches. The ability of the clamping device 22 to clamp pieces over a wide range of thicknesses greatly increases its versatility. It will be apparent to those skilled in the art that a clamping device may be provided with or without the rear end 32 workpiece-receiving surface 64.

Referring now to FIG. 4, the clamping device 22 is shown fastened to the slotted work station 20 via fastening screw 36. T-nut 42 is held rigidly within work station slots 66, and the fastening screw head 38 biases the clamping member 24 against the surface of the slotted working surface.

FIG. 4 also shows the clamp nosepiece 54 held in the shaft-receiving opening 50 by the dowel 48. The dowel passes directly through the dowel-receiving slot 58 in the shaft 46. Spring 5 held within shaft 56 between the dowel pin 48 and the crossbar 60 biases the clamp nosepiece 54 against the workpiece 16, which is received within the stepped, workpiece-receiving edge 62. The angle of the nosepiece 54 caused by the sloped front end 30 creates a vertical component to the clamping force which is not present in various clamps currently available. This extra component of force contributes to the overall vertical stability of the clamp, thereby improving engraving accuracy without damage to the workpiece surface.

Referring still to FIG. 4, the various components of horizontal and vertical force can be seen more clearly with reference to the force vectors depicted by the arrows. As the clamp 22 is pushed against the workpiece 16 by the operator, a horizontal force F1 is translated into a resultant force composed of a horizontal force F2 and vertical force F3. The spring 52 maintains this force, and provides self-alignment.

Subsequently, an additional vertical force F4 is applied by the operator in fastening screw 36 to tighten the clamp 22 against the slotted work surface 20. This force is in addition to F3, the total force being applied represented by FTI.

Although the above invention has been described with reference to a preferred embodiment, it will be recognized by those skilled in the art that modifications and changes can be made to the preferred embodiments which are still within the scope of this invention and the claims appended hereto.

I claim:

1. A clamping device for use with a slotted work surface which comprisees:

a spring means;

a threaded screw having an enlarged head and a shaft;

a cylindrical dowel;

a T-nut for receiving said threaded screw;

a elongate clamp member having upper and lower parallel surfaces and sloped front and back ends;

a screw-receiving slot through said clamp member upper and lower surfaces disposed along the clamp member longitudinal axis;

a clamp member, dowel-receiving aperture disposed horizontally through the clamp member near the front end of the clamp member;

a clamp member, shaft-receiving opening through said clamp member front end disposed along said clamp member longitudinal axis near the front end of said clamp member;

a clamp nosepiece having an elongate, cylindrical shaft and a crossbar which is fastened to the shaft perpendicular to the shaft longitudinal axis and which has workpiece-receiving channels on a surface distal from said shaft;

a spring means receiving cavity within the clamp nosepiece shaft; and a nosepiece dowel-receiving slot through said clamp nosepiece shaft along the shaft longitudinal axis, whereby said threaded screw and T-nut cooperate to rigidly fasten said clamp member to a slotted work station surface and wherein said spring means is held within the nosepiece shaft between the crossbar and the dowel pin to selectively bias the clamp nosepiece against a workpiece.

2. A clamping device as in claim 1 wherein said T-nut has a cylindrically shaped, internally threaded member for receiving said threaded screw an an enlarged base member having two parallel edges which cooperate with said working surface slots.

3. A clamping device as in claim 1 wherein the back sloped end of the lamp member has workpiece receiving channels on the lower surface for holding a workpiece in place.

4. A clamp nosepiece for use in holding thin workpieces in place on a horizontal working surface, which comprises in combination, an elongate, hollow cylindrical shaft, open at one end, having a dowel receiving slot which traverses the outer surface of said hollow shaft to create a slot disposed along the shaft longitudinal axis;

a dowel, disposed in said dowel receiving slot perpendicular to said shaft longitudinal axis;

spring means contained within said hollow cylindrical shaft, between a closed end of said shaft and the dowel; and, a substantially prism-shaped chock, having triangular bases, fastened to the closed end of said elongate shaft at one of said chock's faces, the chock face distal from said shaft, modified to form a workpiece receiving surface, having channels running the length of said chock, said channels providing surfaces which are perpendicular to the horizontal working surface, wherein said elongate shaft is fastened to said chock at an acute angle measured from the horizontal working surface.

* * * * *